US007943222B2

(12) United States Patent
Rivest

(10) Patent No.: US 7,943,222 B2

(45) Date of Patent: *May 17, 2011

(54) ADHESIVE-BACKED EXTENDER TRIM MATERIAL

(76) Inventor: Ken R. Rivest, Lamont, FL (US)

( * ) Notice: Subject to any disclaimer, the term of this patent is extended or adjusted under 35 U.S.C. 154(b) by 826 days.

This patent is subject to a terminal disclaimer.

(21) Appl. No.: 11/528,252

(22) Filed: Sep. 27, 2006

(65) Prior Publication Data

US 2007/0020425 A1 Jan. 25, 2007

Related U.S. Application Data

(63) Continuation-in-part of application No. 10/876,955, filed on Jun. 26, 2004, now Pat. No. 7,220,472.

(51) Int. Cl.
*B32B 9/00* (2006.01)
*B32B 33/00* (2006.01)
*B32B 3/30* (2006.01)
*B32B 3/00* (2006.01)

(52) U.S. Cl. ........ 428/40.1; 428/42.1; 428/43; 428/156; 428/167

(58) Field of Classification Search ................. 428/40.1, 428/42.1, 43, 906, 156; 206/411; 225/25, 225/48, 77, 1, 2

See application file for complete search history.

(56) References Cited

U.S. PATENT DOCUMENTS 7,785,684 B2 * 8/2010 Halle .......................... 428/40.1
2008/0003393 A1 * 1/2008 Halle .......................... 428/40.1

OTHER PUBLICATIONS http://web.archive.org/web20040205011309/http://www.trimquick.com, Feb. 2, 2004, Home Page.*
http://web.archive.org/web20040205011309/http://www.trimquick.com, Feb. 2, 2004, TrimQuick Product Details.*
U.S. Appl. No. 10/876,955.

* cited by examiner

*Primary Examiner* — Patricia L Nordmeyer
(74) *Attorney, Agent, or Firm* — J. Wiley Horton

(57) ABSTRACT

A plastic trim strip useful for trimming the installation of doors, windows, and the like. The trim strip has a first side suitable for viewing in a finished installation, and a second side with at least one band of contact adhesive. In storage, the contact adhesive is covered by a peelable backing. The trim strip is formed of material which is capable of some deformation while retaining the elastic memory to retain its original flat shape. The trim strip can be cut, bent, roll formed, etc. to produce the shape desired for the installation. The user then removes the peelable backing and uses the contact adhesive to affix the strip in the desired location. The trim strip is preferably stored in a roll within a dispenser box. The dispenser box allows the compact storage and transportation of many feet of the material.

8 Claims, 17 Drawing Sheets

ADHESIVE-BACKED EXTENDER TRIM MATERIAL

CROSS-REFERENCES TO RELATED APPLICATIONS

This application is a continuation-in-part of U.S. application Ser. No. 10/876,955 to Rivest, which was filed on 26 Jun. 2004 now U.S. Pat. No. 7,220,472. The entire disclosure of U.S. application Ser. No. 10/876,955 is hereby incorporated by reference.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention.

This invention relates to the field of construction and repair. More specifically, the invention comprises a trim material useful for completing the installation of windows, doors, and the like.

2. Description of the Related Art.

FIG. 1 shows a typical window installed in the wall of a structure. Those skilled in the art will know that there are many variations in window and wall construction known in the art. Thus, the illustrations in FIGS. 1 through 6 are merely representative. Old window 10 is installed in wall 11. Panels of siding 12 cover the exterior of wall 11. Window casings 14—typically wood boards—are attached both to old window 10 and to siding 12. They provide a finished appearance, as well as providing a moisture seal. The exterior surface of wall 11 could also typically be covered by lapped board siding, brick veneer, or vinyl.

FIG. 2 shows the same structure from the interior side of wall 11. There would typically be insulation, drywall, and other materials present in this view. These have been removed in order to clearly illustrate the structure. Wall 11 is formed by a series of studs 16. When wall 11 is framed, provisions must be made for the mounting of old window 10. A series of cripple studs 22 are installed. An opening for the window is then formed through the use of header 18, two portal sides 24, and a portal base 20. Again, there are many different approaches to forming such a portal. The one illustrated is merely representative.

Old window 10 is installed within the portal thus formed. A series of shims 26 are used to bridge the gap between portal sides 24 and old window 10. These also serve to center the window in the opening.

It is common for windows to be replaced long before the structure containing them wears out. FIG. 3 illustrates the first step in the process of removing a window. Casings 14 have been removed, exposing opening 28 in siding 12. FIG. 4 shows old window 10 having been removed from wall 11. Shims 26 are shown still attached to old window 10, though in reality they may be removed during the process. The reader will observe that header 18, the two portal sides 24, and portal base 20 are now visible through opening 28. A new window must typically be attached using these elements.

FIG. 5 shows new window 30 in position for installation. As for old window 10, there are many different types of new window 30. The replacement window shown is formed of vinyl. It consists primarily of box structure 34. The mounting methodology for new window 30 is different, as it is designed to be attached using long screws driven through the side jambs and into the surrounding window opening.

Those skilled in the art will know that many older windows were made to non-standard sizes. Although many sizes of new windows are now available, it is often only possible to approximate the size of a window to be replaced. This is the case for the version shown in FIG. 5. FIG. 6 shows new window 30 installed in opening 28. Window facing 32 is the forward-facing portion of the window. It provides the basis for attaching any trim elements.

The reader will observe that the new window is an inexact fit. Gaps 38 are visible around the perimeter. These will need to be properly covered, both for aesthetic and functional purposes. In addition, window facing 32 does not provide a truly finished appearance. Although it can be painted, it is often not intended to present the same visual appeal as the casings 14 did for old window 10. Accordingly, a new element is needed. This new element comprises the present invention.

BRIEF SUMMARY OF THE INVENTION

The present invention comprises a plastic trim strip useful for trimming the installation of doors, windows, and the like. The trim strip has a first side suitable for viewing in a finished installation, and a second side with at least one band of contact adhesive. In storage, the contact adhesive is covered by a peelable backing. The trim strip is formed of material which is capable of some deformation while retaining the elastic memory to retain its original flat shape. The trim strip can be cut, sheared, mitered, sanded, etc. to produce the shape desired for the installation. The user then removes the peelable backing and uses the contact adhesive to affix the strip in the desired location. The trim strip is preferably stored in a roll within a dispenser box. The dispenser box allows the compact storage and transportation of many feet of the material.

Figure 1:
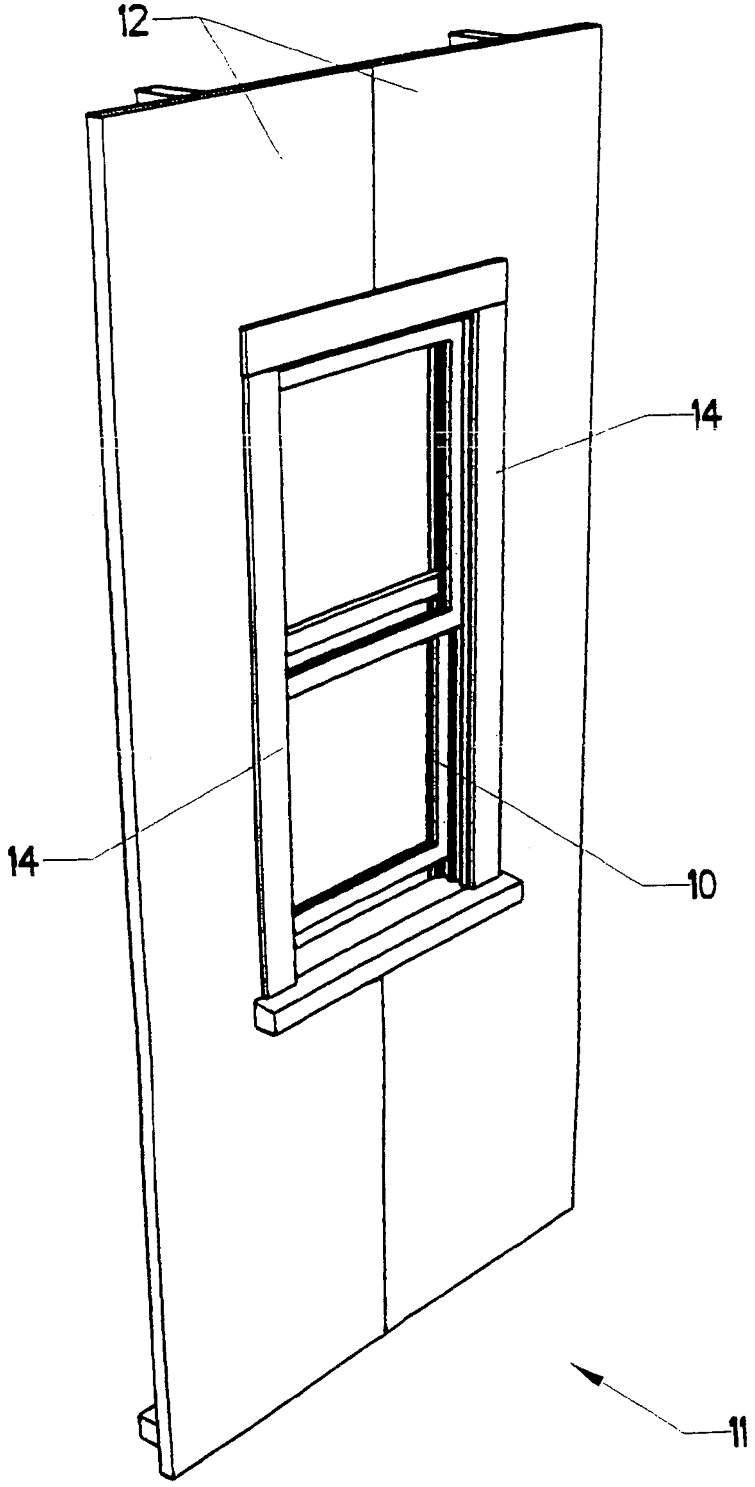
FIG. 1 (PRIOR ART)
FIG. 1 is a perspective view, showing a prior art window.
Figure 2:
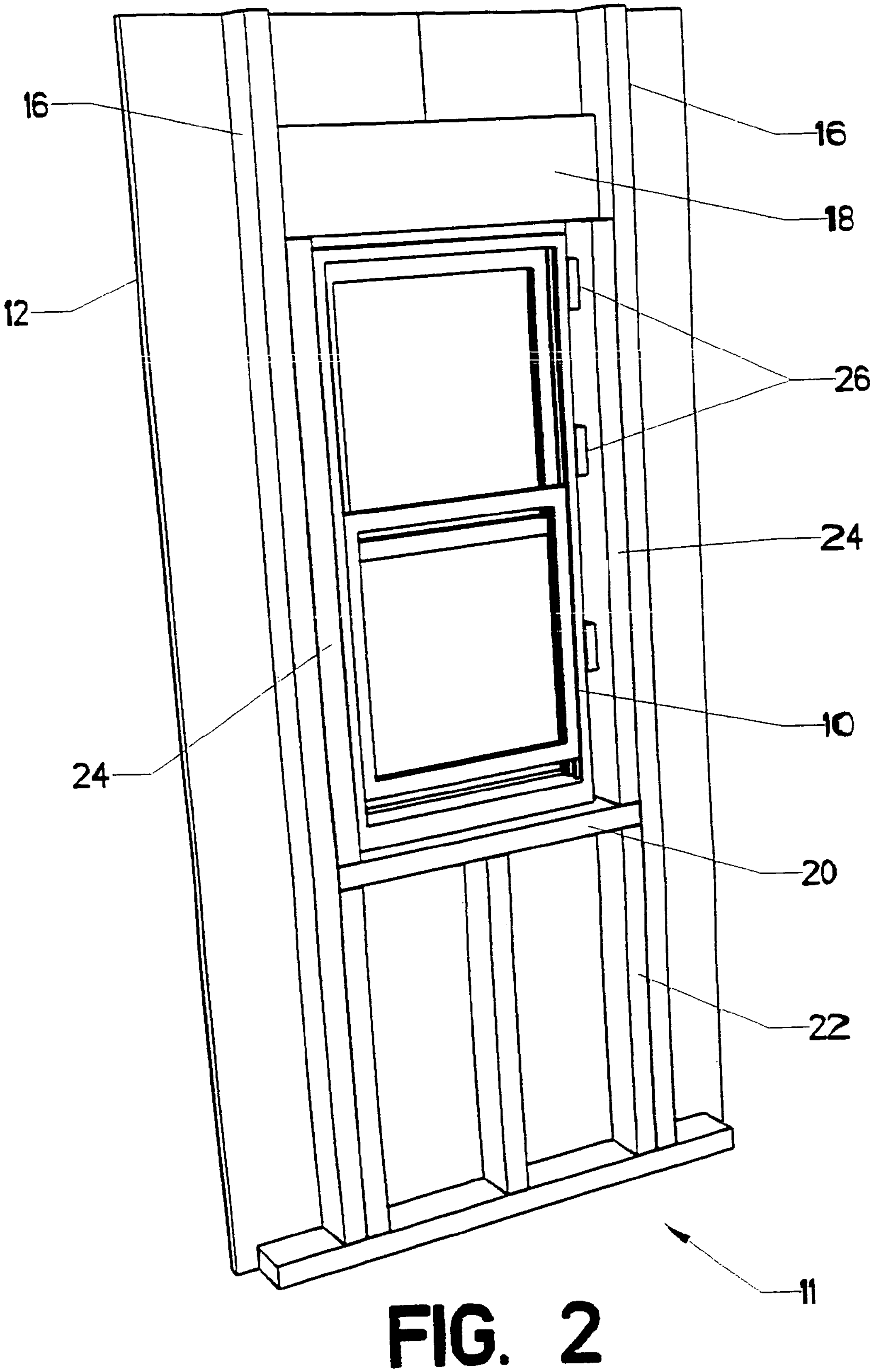
FIG. 2 (PRIOR ART)
FIG. 2 is a perspective view, showing a prior art window.
Figure 3:
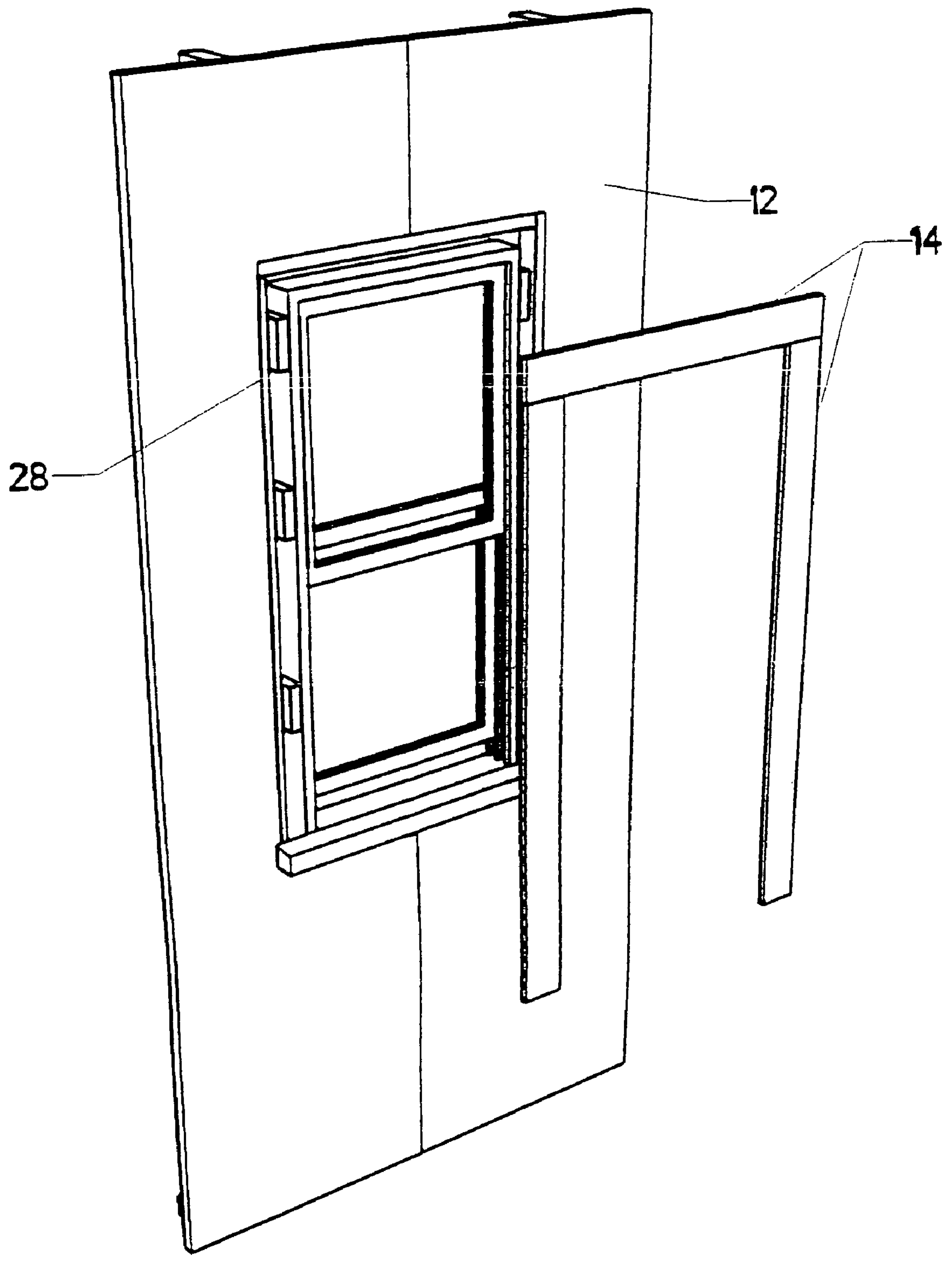
FIG. 3 (PRIOR ART)
FIG. 3 is a perspective view, showing a prior art window.
Figure 4:
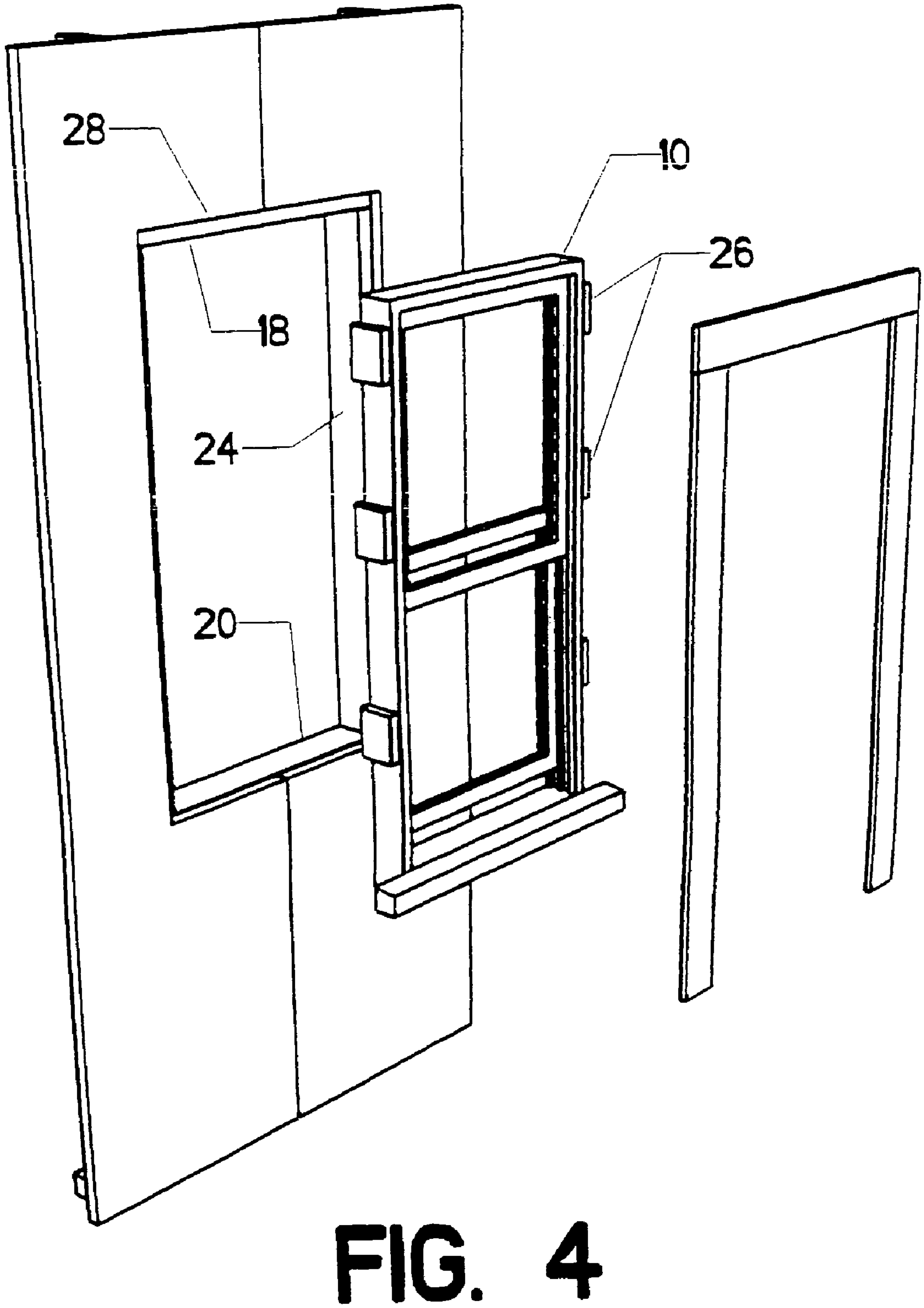
FIG. 4 (PRIOR ART)
FIG. 4 is a perspective view, showing a prior art window being removed.
Figure 5:
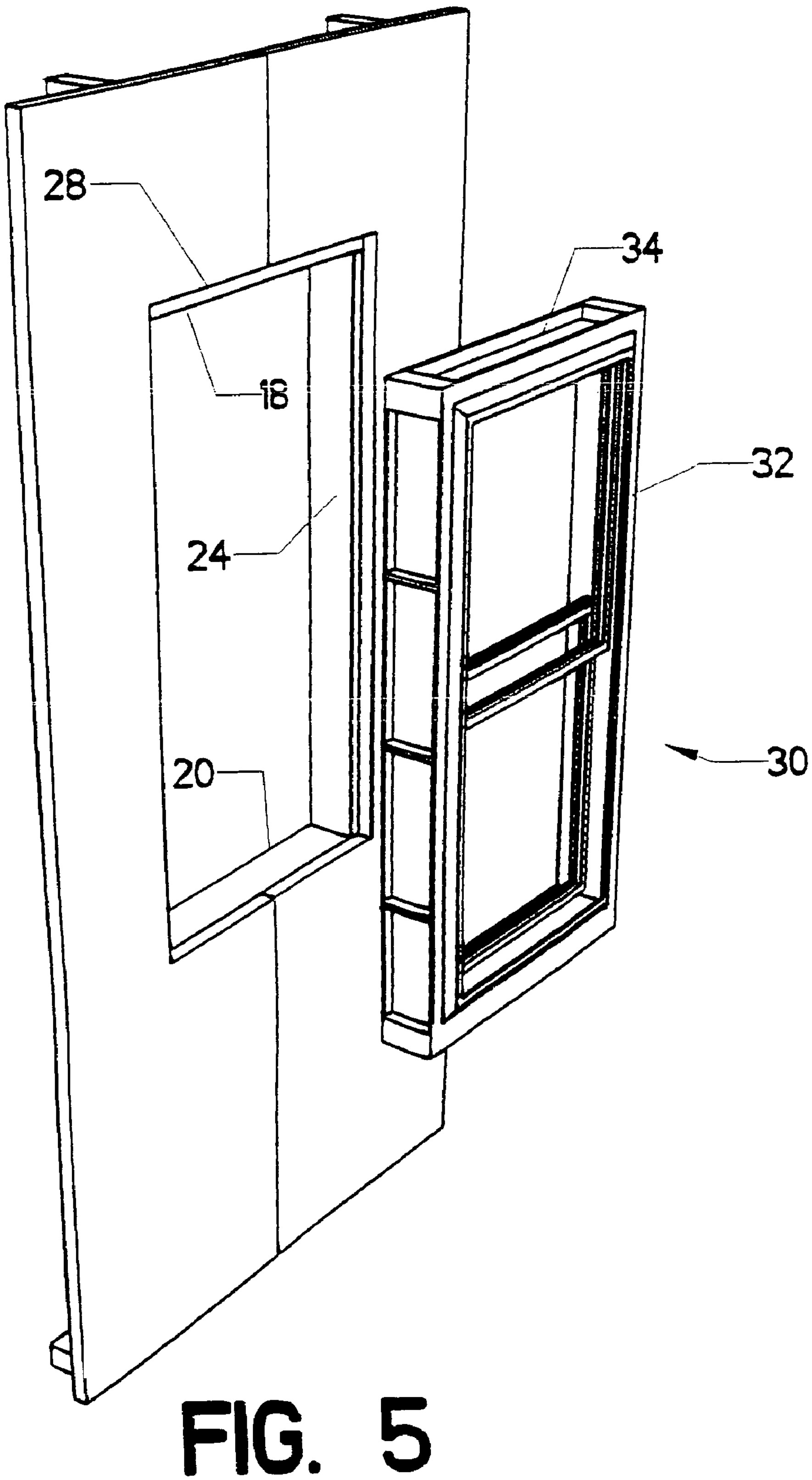
FIG. 5 (PRIOR ART)
FIG. 5 is a perspective view, showing a modern window being installed.

| REFERENCE NUMERALS IN THE DRAWINGS | | | |
|---|---|---|---|
| 10 | old window | 11 | wall |
| 12 | siding | 14 | casing |
| 16 | stud | 18 | header |
| 20 | portal base | 22 | cripple stud |
| 24 | portal side | 26 | shim |
| 28 | opening | 30 | new window |
| 32 | window facing | 34 | box structure |
| 38 | gap | 40 | trim strip |
| 42 | miter cut | 44 | facing |
| 46 | contact adhesive | 48 | backing |
| 50 | trim strip roll | 52 | dispenser box |
| 54 | feed slot | 58 | handle |
| 62 | outer portion | 64 | inner portion |
| 66 | alternate trim strip | 68 | score line |
| 70 | first trim strip | 72 | second trim strip |
| 74 | waste material | 76 | first side edge |
| 78 | second side edge | | |

DETAILED DESCRIPTION OF THE INVENTION

Figure 6:
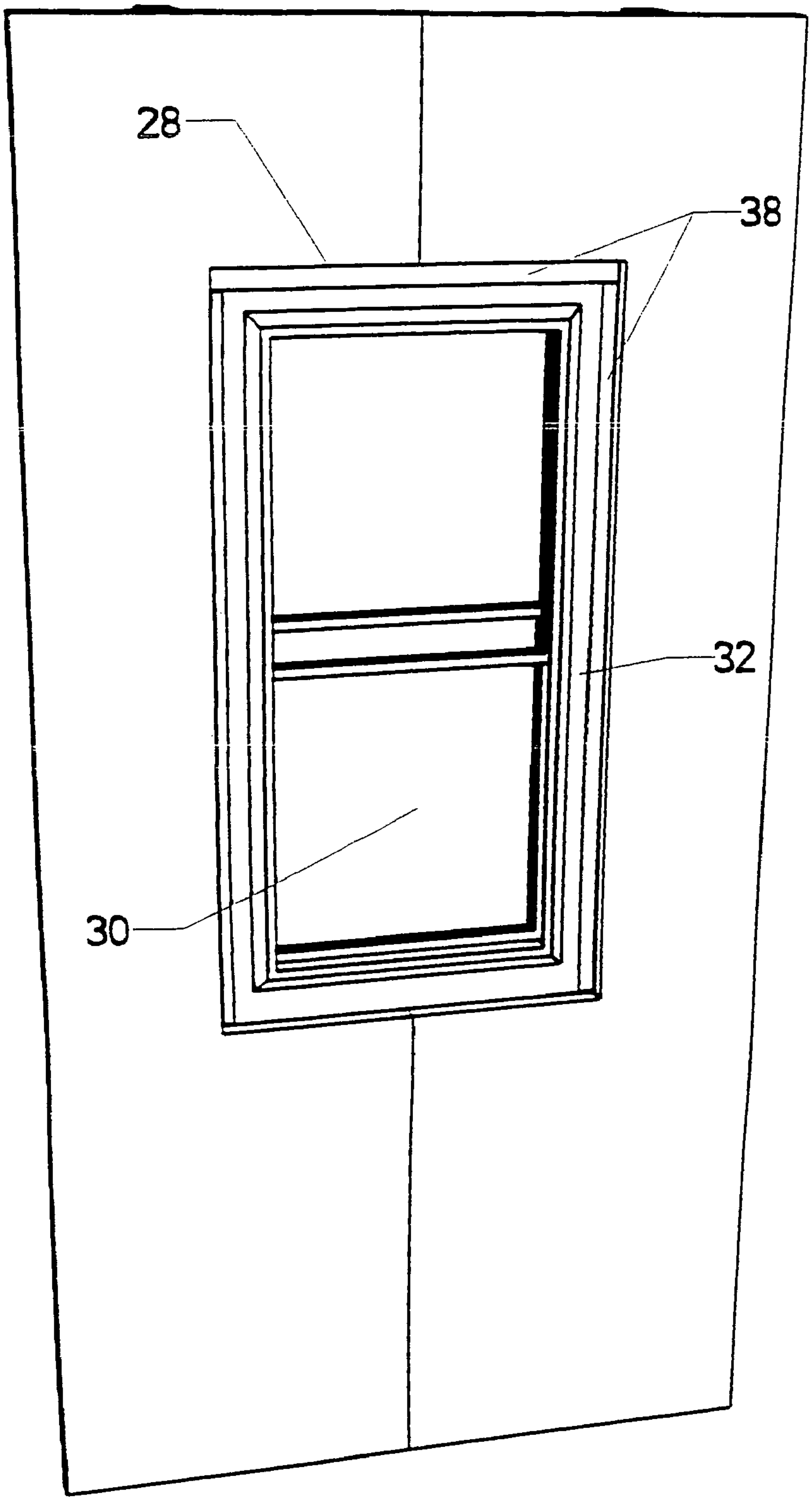
FIG. 6 (PRIOR ART)
FIG. 6 is a perspective view, showing a modern window installed.
Figure 7:
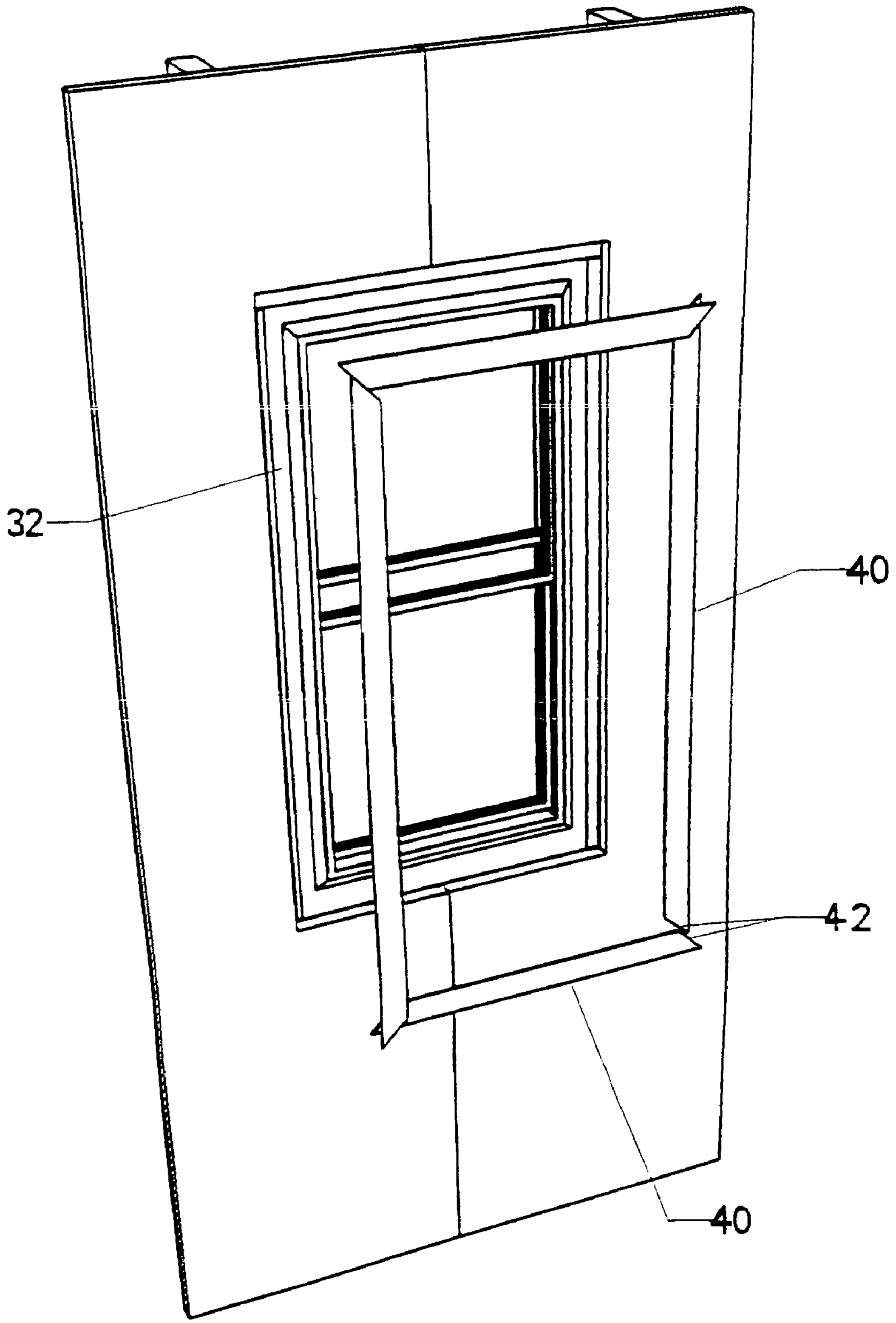
FIG. 7 is a perspective view, showing the present invention.

As explained previously, FIG. 6 shows new window 30 installed in opening 28, leaving gaps 38. In FIG. 7, four trim strips 40 have been cut to fit over window facing 32 and cover gaps 38. Each trims trip 40 has a pair of miter cuts 42. Other types of joinery can be used between adjoining trim strips, such as square cuts. The back surface of each trim strip 40 (facing away from the viewer as shown) is covered with a high-strength adhesive strip. These strips are pressed into contact with facing 32, thereby holding each trim strip 40 in place.

Figure 8:
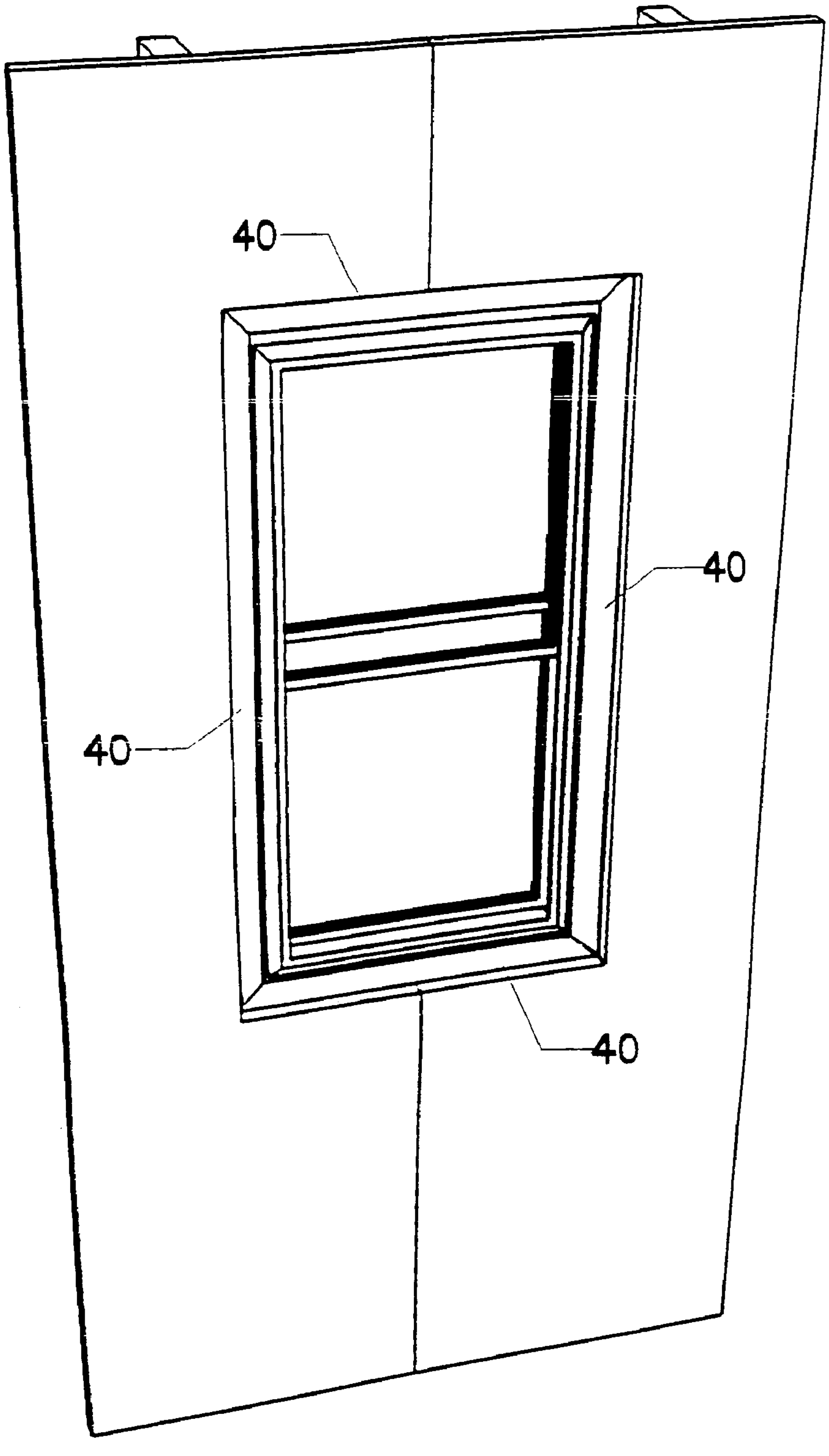
FIG. 8 is a perspective view, showing the present invention.

FIG. 8 shows the four trim strips 40 pressed into place, with the four pairs of miter cuts 42 aligned a bead of caulk can be applied around the outer perimeter of the four trim strips 40 to provide additional trim strip bonding and a weather tight seal. The installation shown will last for many years.

Figure 9:
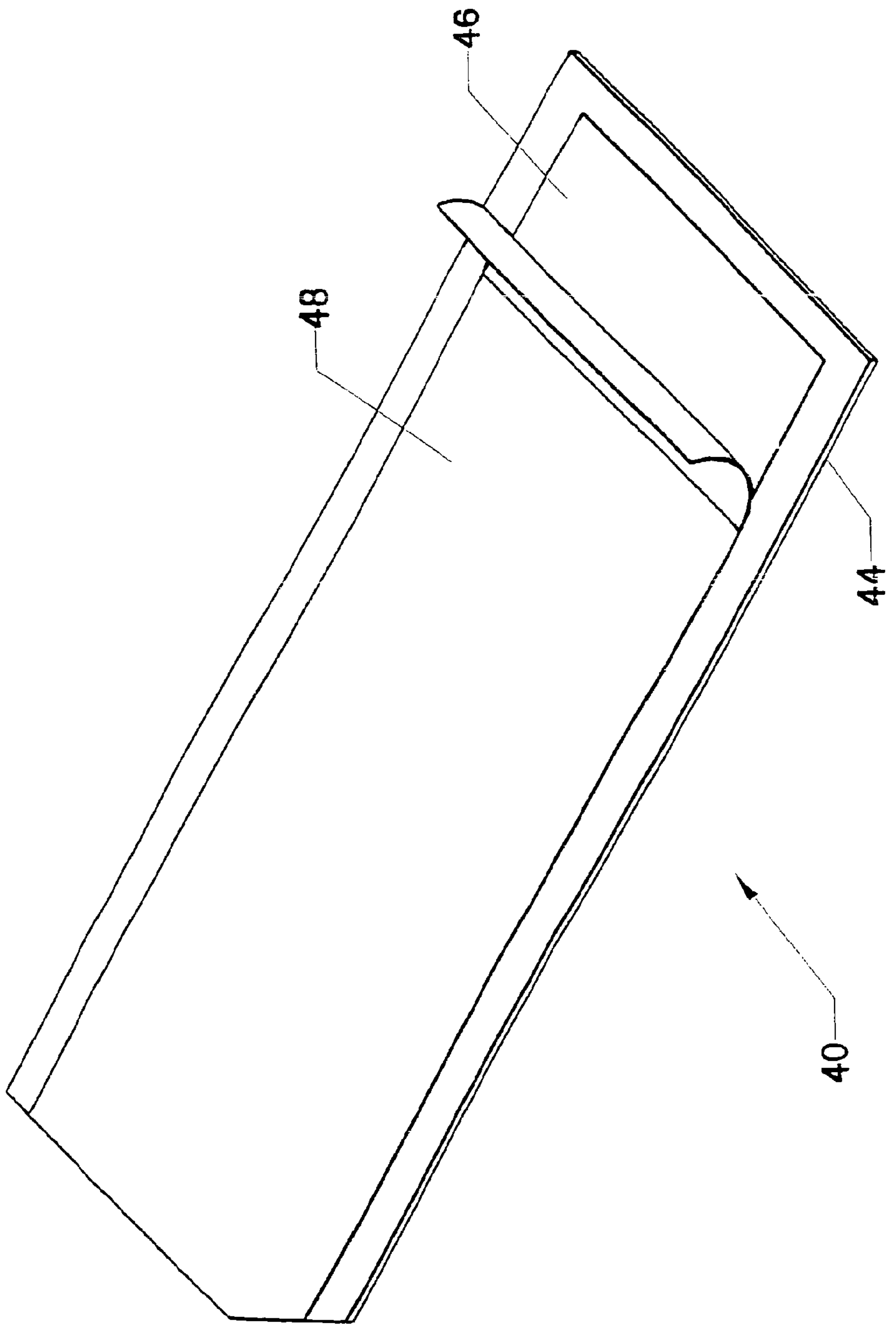
FIG. 9 is an isometric view, showing the present invention

The material used for the trim strips 40 must be easily cut to the appropriate shape, since it is impractical to have trim strips 40 pre-cut to the right length and shape (owing to the endless variety of such lengths and shapes which will be needed for various installations). FIG. 9 shows a section of trim strip 40 in more detail. The primary structural element is facing 44. It has two sides. The side facing away from the viewer in FIG. 9 is the side facing the viewer in FIGS. 7 and 8. It is a finished surface having a smooth, aesthetically appealing appearance. It matches or visually blends with the window material. It can also be painted to match the color of other trim. The side facing toward the viewer in FIG. 9 has a strip of contact adhesive 46 affixed. Contact adhesive 46 is covered by a peelable backing 48.

Facing 44 is preferably made from an inexpensive plastic material such as polyvinyl chloride (PVC). Those skilled in the art will know that many grades and formulations of PVC are available. For this application, a grade should be selected which is capable of some deformation while retaining the elastic memory to retain its original flat shape. The need for these features will be made apparent in the following.

Figure 10:
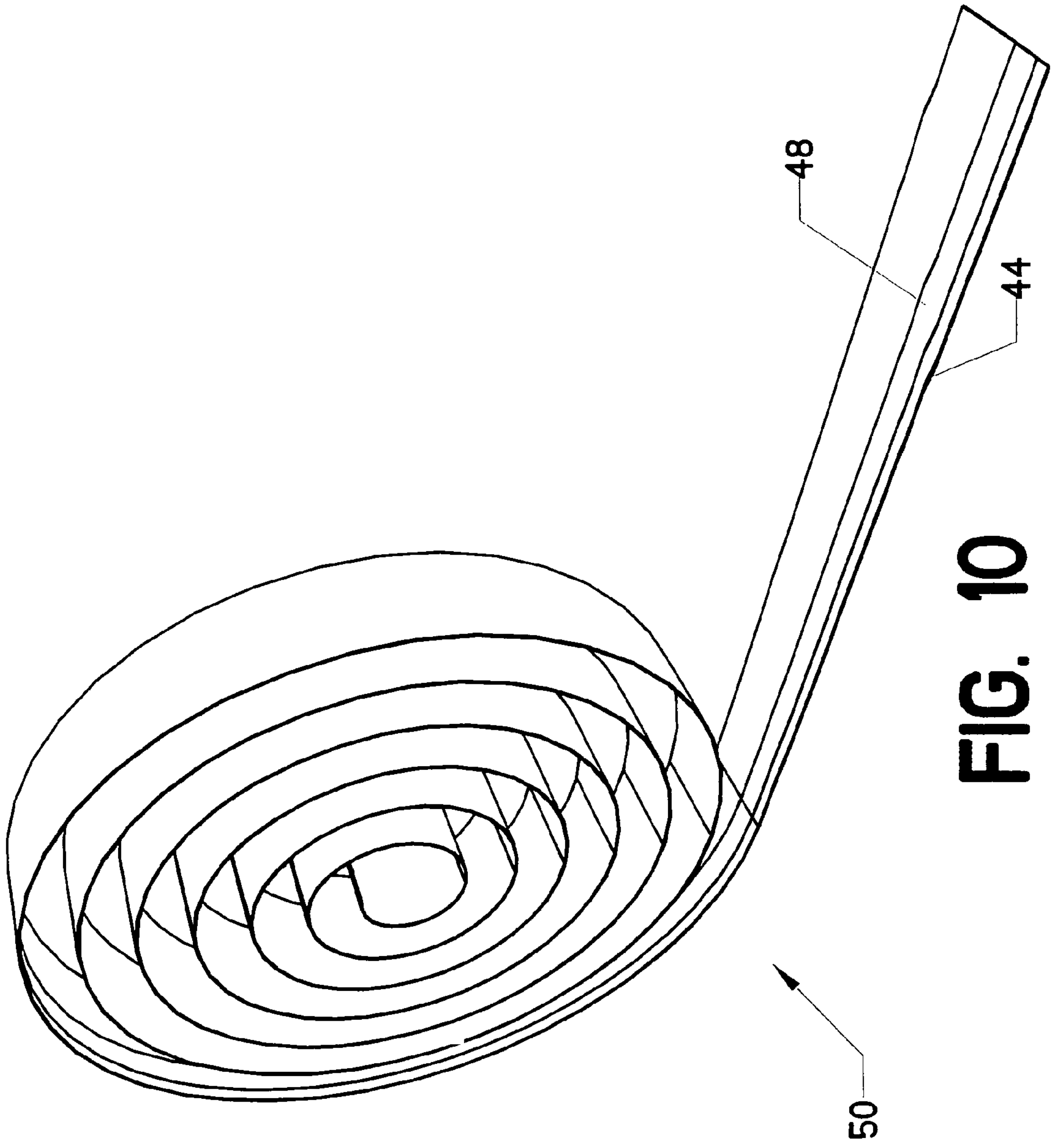
FIG. 10 is a perspective view, showing the present invention.

A user installing windows will need many feet of trim strips 40. It is difficult to carry such strips. Additionally, if such strips are cut into fixed lengths, many feet of scrap will result. Accordingly, it is preferable to carry such strips in the form of a roll. FIG. 10 shows trim strip roll 50. It is simply a roll of facing 44 with the adhesive and backing 48 in place. The PVC is selected so that it is capable of deforming to form the roll without retaining the deformation. In other words, when drawn out of the roll, it will return nearly to a flat state (some warpage may remain, but this will be easily smoothed during installation). Because of this fact, trim strip roll 50 has a tendency to unwind itself. It is therefore desirable-to retain trim strip roll 50 in some sort of housing.

Figure 11:
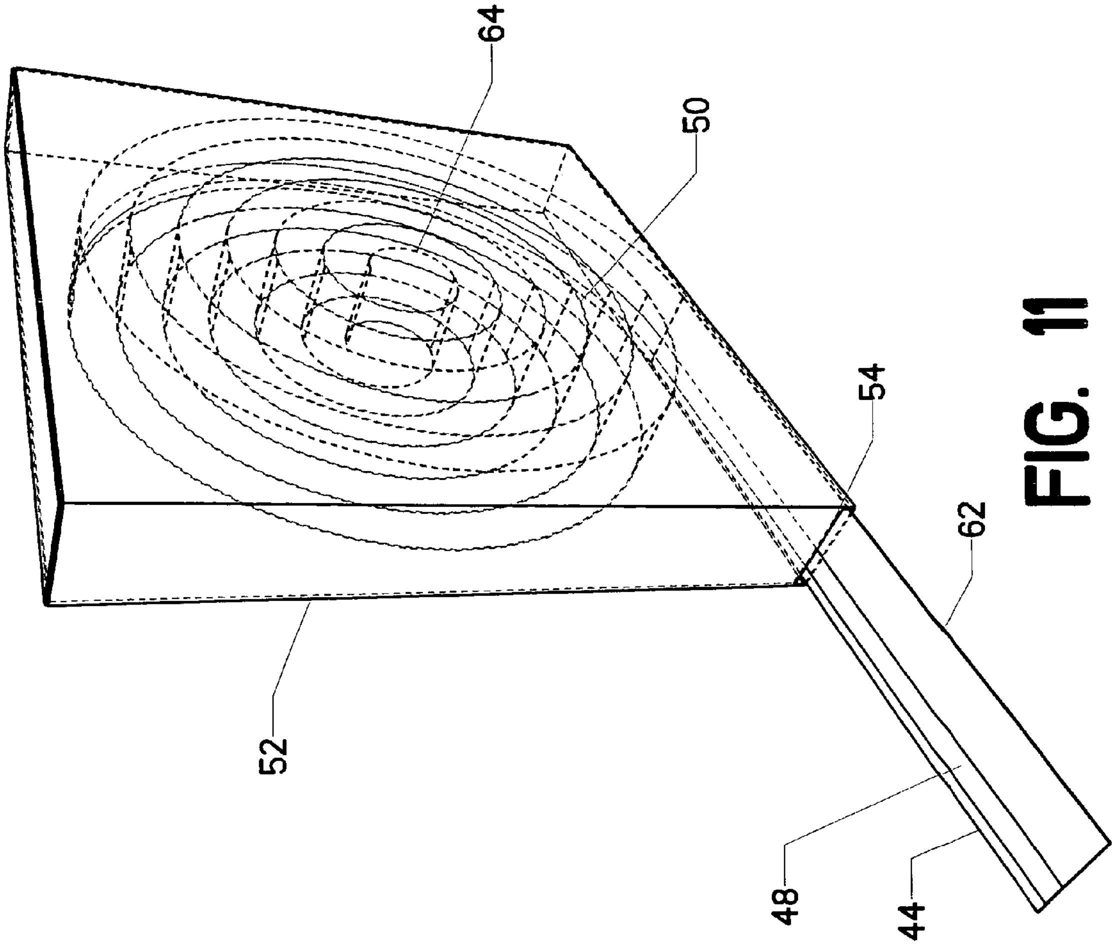
FIG. 11 is a perspective view, showing the present invention.

FIG. 11 shows trim strip roll 50 placed inside dispenser box 52. Dispenser box 52 is preferably made of an inexpensive material such as cardboard. The inner portion 64 of trim strip roll 50 is placed near the box's center. Outer portion 62 (coming off the outside of the roll) extends out of dispenser box 52 through feed slot 54.

When the user needs a piece of trim strip 40, he or she grabs outer portion 62 and pulls a sufficient length out of dispenser box 52. The user then cuts this portion free using a utility knife or other suitable implement. The free portion is then flattened and cut to fit the desired trim application. It can be cut using a utility knife, tin snips, or other prior art equipment.

Those skilled in the art will realize that the loops of trim strip 40 contained within trim strip roll 50 can be bunched much more tightly than is illustrated. Thus, many feet of the material can be contained within a box of modest size.

Figure 12:
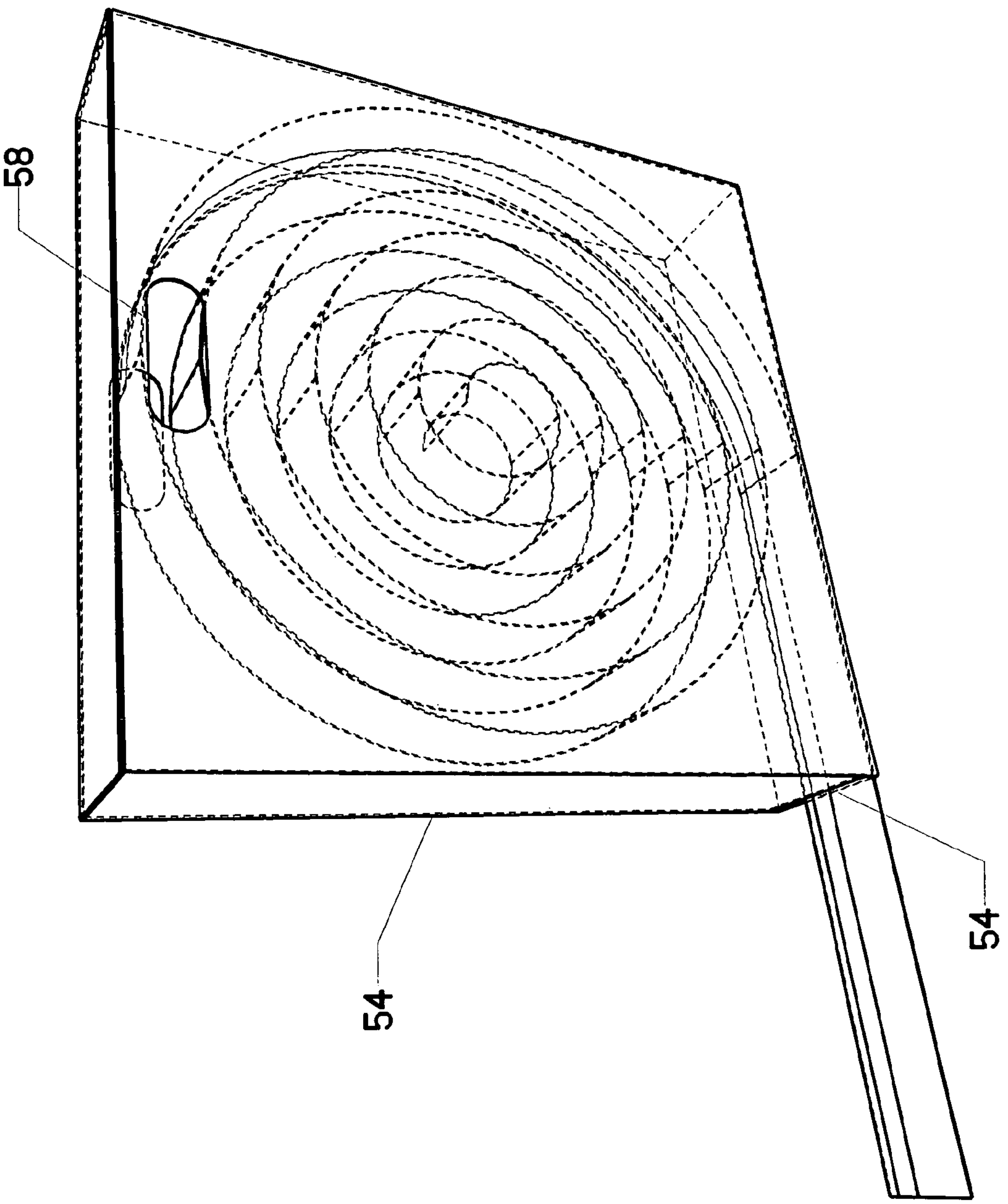
FIG. 12 is a perspective view, showing the present invention.

Additional features can be added to dispenser box 52 to improve the device. FIG. 12 depicts improved dispenser box 54. Those skilled in the art will also realize that a full box—containing many feet of trim strip 40—can be quite heavy. Handle 58—which is simply a slot punched through the sides of the box—can added to dispenser box 54 to aid in carrying the device to the work site.

It is often necessary to reduce the width of facing 44. The PVC material used for trim strip 40 can be placed in a mechanical press break or shear, as is typically used for sheet metal work. The shear will simply shear the trim strip to the appropriate width. The press break will bend the trim strip—thereby scoring it along a straight line which can then be manually cut.

Many additional operations can be performed on trim strips 40. They can be ripped (such as by a table saw) to reduce their overall width, sheared to reduce length, miter cut for joinery, roll formed for larger curves, sanded, and painted.

For some persons performing installation work, it may be undesirable to carry a shear or press break (generally large and bulky items). Features allowing the width of the trim strip to be varied without the use of a saw, shear, or similar item are therefore desirable. Looking back at FIG. 7, the reader will appreciate that the width of trim strip 40 need not be exact. This is true because a portion of its inner edge overlaps a portion of the flat forward-facing surface of the window frame. A bit more or bit less of overlap allows some adjustment in the width needed for the trim strip. Thus, if the trim strip can be modified to provide several incremental widths, it can serve for nearly all windows.

Figure 13:
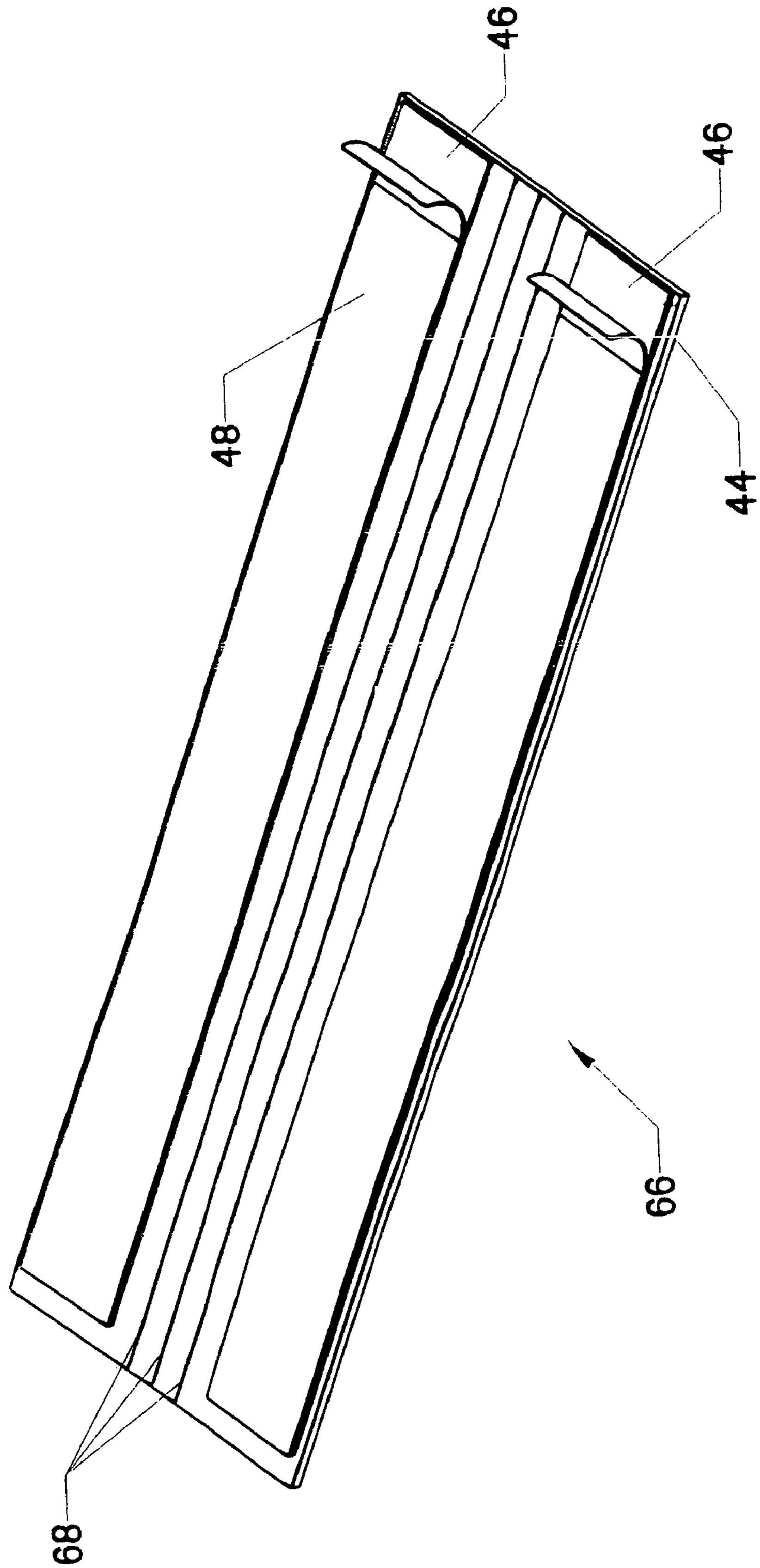
FIG. 13 is a perspective view, showing an alternate embodiment.

FIG. 13 shows just such a trim strip, denoted as alternate trim strip 66. It features a facing 44 as for the original design. However, it has two strips of contact adhesive. A first strip of contact adhesive 46 runs proximate first side edge 76. A second strip of contact adhesive runs proximate second side edge 78.

A plurality of score lines 68 run between the two strips of contact adhesive. These are notches cut into the inward facing surface (meaning the side that faces the window when the strip is installed). One score line is preferably located at the center of the facing. All the score lines are deep enough so that if the facing is bent along the score line, it will break.

Figure 14:
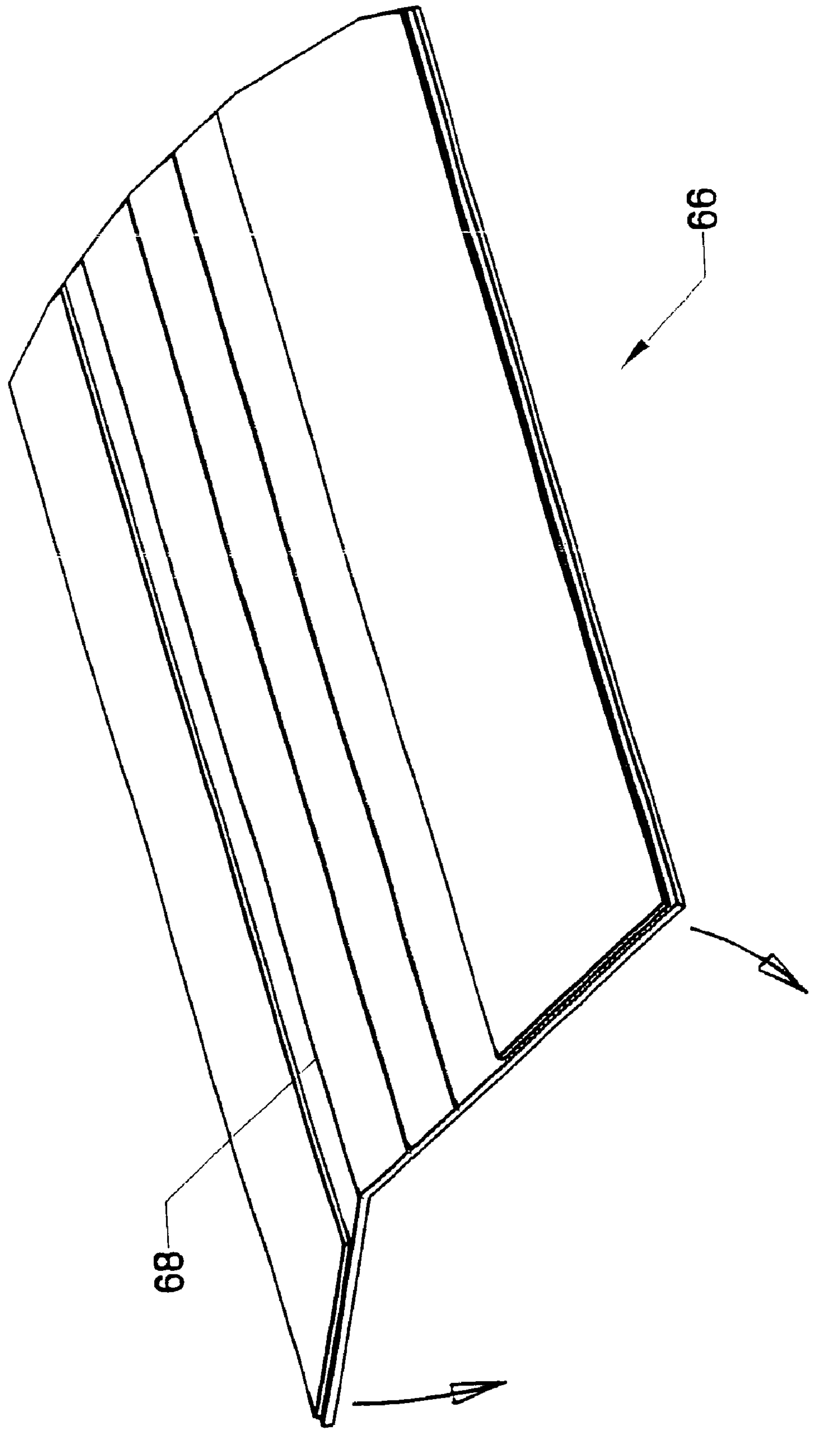
FIG. 14 is a perspective view, showing an alternate embodiment.
Figure 15:
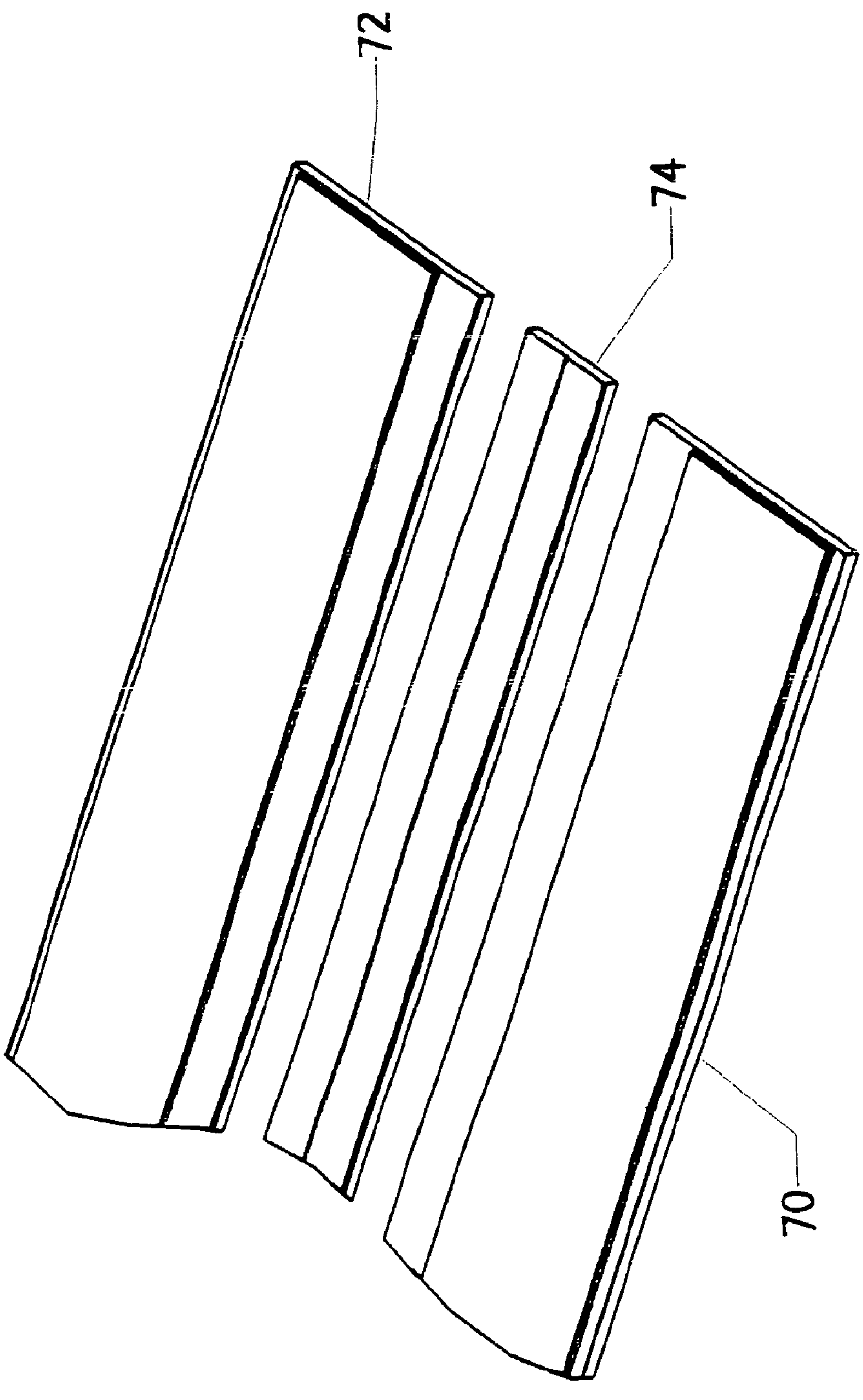
FIG. 15 is a perspective view, showing an alternate embodiment.

FIG. 14 shows this operation. Alternate trim strip 66 is being bent along score line 68. Once the bend is made, the trim strip can be separated into two pieces along the score line (Some repetitive flexing may be needed to completely separate the two pieces). FIG. 15 shows an alternate trim strip which has been separated into three pieces, by breaking it along to of the score lines. The reader will observe that first trim strip 70 and second trim strip 72 are identical. They can both be cut to length and pressed onto a window. The remaining central piece is generally discarded, which is why it is labeled as waste material 74 in the view. Of course, two identical trim strips can be made by breaking the alternate trim strip along the score line running down its center.

The reader will note that the score lines may also be used as a "guide" for cutting the trim material with a utility knife. Instead of repeatedly bending the trim strip until the trim fractures along the score line, the user may run a utility knife or blade down the length of the appropriate score line. This will allow the trim strip to be more easily separated than if the trim material is simply bent along the score line.

Figure 16:
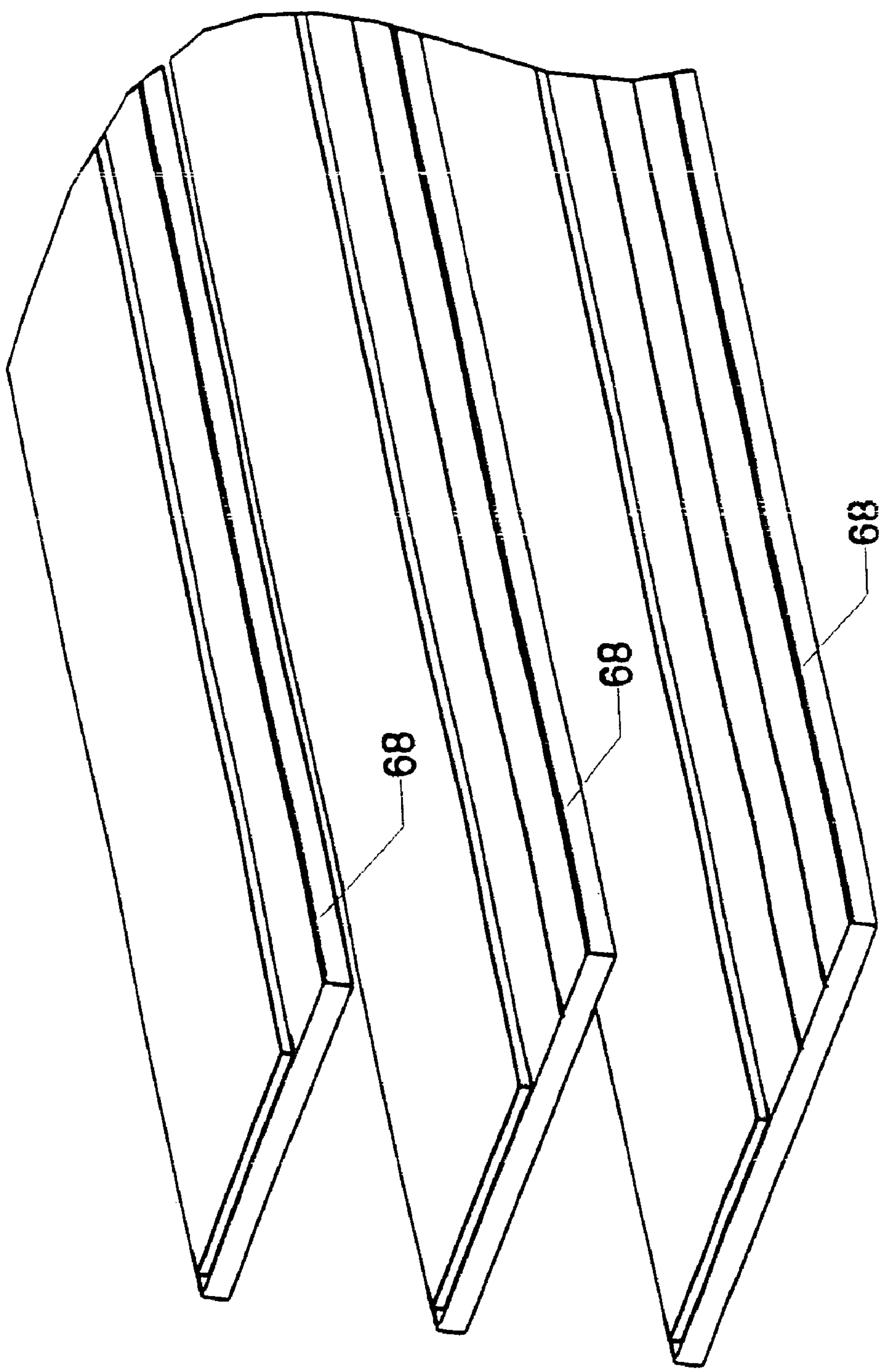
FIG. 16 is a perspective view, showing an alternate embodiment.

The use of three score lines allows the creation of a trim strip having three different widths. FIG. 16 demonstrates this fact. The upper trim strip has been cut or broken along the left hand (with respect to the particular view) score line 68. The middle trim strip has been cut or broken along the center score line. The lower trim strip has been cut or broken along the right hand trim strip.

Figure 17:
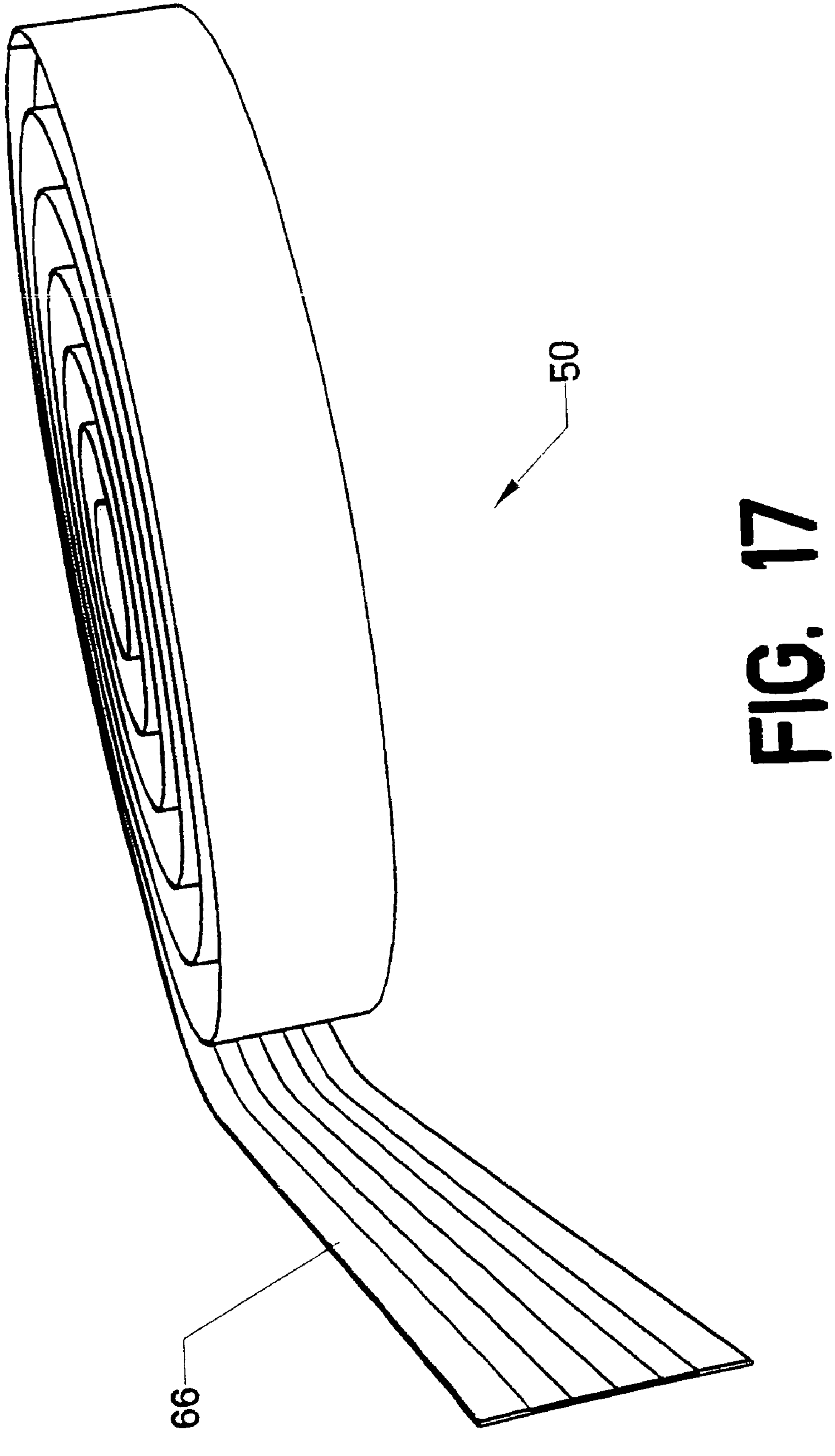
FIG. 17 is a perspective view, showing an alternate embodiment.

FIG. 17 shows alternate trim strip 66 wound into a trim strip roll 50. It can be placed in a box or other suitable storage in order to facilitate transporting and dispensing the product.

The reader will appreciate that the trim strip can also be provided with a single strip of contact adhesive. For example, the trim material may appear similar to the trim strip shown at the bottom of FIG. 16. In this embodiment, the trim strip has a single strip of contact adhesive on one side and an adhesive-free portion on the other side. Various numbers of score lines may be provided in the adhesive-free portion. However, the trim material preferably has between two to six score lines to accommodate most trimming applications.

Although the installation has been shown on a structure using simple panel siding, the invention can be employed with virtually any type of construction, including formed concrete, concrete block, lapped siding, and brick veneer siding. It is equally applicable to finishing door installations, cabinetry, and interior trim. The principles of using the invention for these applications is the same as for the window application illustrated.

The preceding description contains significant detail regarding the novel aspects of the present invention. It is should not be construed, however, as limiting the scope of the invention but rather as providing illustrations of the preferred embodiments of the invention. As one example, a wider trim strip could be provided with four, five, six, or more score lines. This would allow such a trim strip to be used over a wider range of widths. Such a modification is still within the scope of the present invention. Thus, the scope of the invention should be fixed by the following claims, rather than by the examples given.

Having described my invention, I claim:

1. An extender trim strip which can be installed by a user, comprising:

a. a flat elongated trim strip facing having a continuous outer edge, formed of a material capable of some deformation while retaining elastic memory to retain its original flat state;

b. a band of contact adhesive, affixed to said inner face of said facing, proximate said first side edge;

c. an adhesive-free portion along said inner face of said facing, proximate said second side edge;

d. a backing, removably covering said band of contact adhesive;

e. wherein said inner face opens into a plurality of score lines lying in said adhesive-free portion of said inner face between said band of contact adhesive and said second edge, said plurality of score lines being parallel to said elongated side edges;

f. wherein each of said score lines creates a localized reduction in thickness of said trim strip; and g. wherein each of said localized reductions weakens said trim strip sufficiently so that folding said trim strip along one of said score lines causes said trim strip to break into two pieces along said score line.

2. A trim strip as recited in claim 1, wherein said trim strip is coiled into a trim strip roll.

3. A trim strip as recited in claim 2, wherein said facing is made of PVC.

4. A trim strip as recited in claim 2, wherein:

a. said trim strip roll has an inner portion proximate the center of said trim strip roll and an outer portion distal from said center of said trim strip roll;

b. said trim strip roll is contained within a dispenser box; and c. said dispenser box opens into a feed slot, through which said outer portion of said trim strip roll can be passed so that said user can grasp said outer portion and progressively pull said trim strip out of said dispenser box.

5. A trim strip as recited in claim 4, wherein said facing is made of PVC.

6. A trim strip as recited in claim 4, wherein said dispense box further comprises a handle.

7. A trim strip as recited in claim 6, wherein said facing is made of PVC.

8. A trim strip as recited in claim 1, wherein said facing is made of PVC.

* * * * *